United States Patent [19]

Barber

[11] 4,246,450

[45] Jan. 20, 1981

[54] TELEPHONE TRANSDUCER ASSEMBLY AND METHOD OF MAKING SAME

[75] Inventor: Eugene Barber, Glen, Miss.

[73] Assignee: International Telephone and Telegraph Corporation, New York, N.Y.

[21] Appl. No.: 42,725

[22] Filed: May 25, 1979

Related U.S. Application Data

[63] Continuation of Ser. No. 890,052, Mar. 27, 1978, abandoned.

[51] Int. Cl.[3] .......... G01G 13/24

[52] U.S. Cl. .......... 179/115.5 R; 179/119 R

[58] Field of Search .......... 179/114 R, 119 R, 115 R, 179/115.5 R

[56] References Cited

U.S. PATENT DOCUMENTS

| | | | |
|---|---|---|---|
| 1,402,546 | 1/1922 | Steinberger | 179/114 R |
| 1,601,656 | 9/1926 | Thayer | 179/115 R |
| 2,346,429 | 4/1944 | Harrison | 179/114 R |
| 2,672,525 | 3/1954 | Pye | 179/114 R |
| 2,705,263 | 3/1955 | Schoeneberg | 179/114 R |
| 3,412,219 | 11/1968 | Karau | 179/114 R |
| 3,542,974 | 11/1970 | Blastic et al. | 179/114 R |

FOREIGN PATENT DOCUMENTS

| | | | |
|---|---|---|---|
| 503676 | 4/1939 | United Kingdom | 179/114 R |
| 637013 | 5/1950 | United Kingdom | 29/594 |

*Primary Examiner*—Vincent P. Canney
*Attorney, Agent, or Firm*—James B. Raden; Marvin M. Chaban

[57] ABSTRACT

A readily assembled transducer assembly. The assembly includes a cup-shaped housing for the transducer magnetic structure. The housing has sized slots for receiving the pole piece tips and nesting members for positioning the coil bobbins, the pole pieces and permanent magnet bar within the housing. The cup is placed on a plate of magnetic material so that the pole tips are attracted to the plate and held firmly in place. With the pole tips held, a potting compound may be introduced into the cup cavity. As the compound is hardening, terminals and a cap cover may be applied. When the compound has set, the assembly is removed and is ready for use.

10 Claims, 11 Drawing Figures

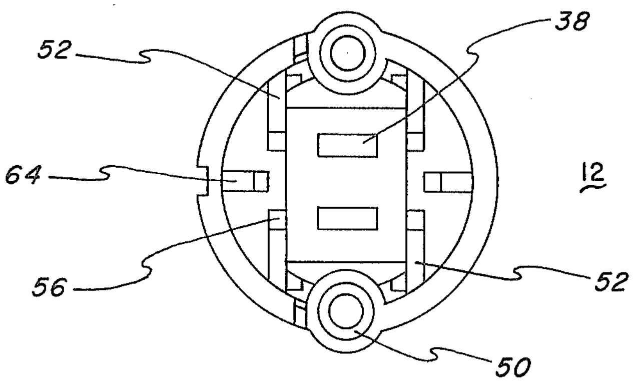
F/G. 3
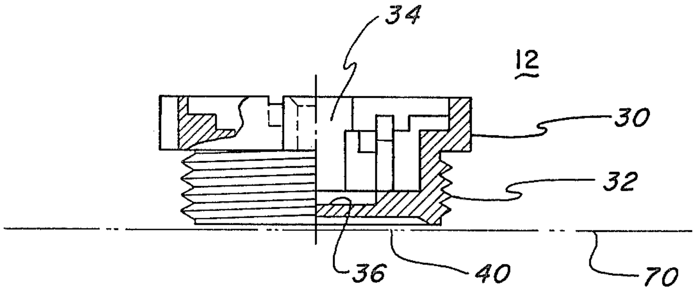
F/G. 4
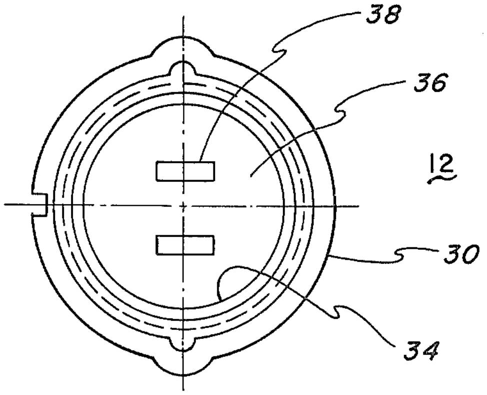
F/G. 5

TELEPHONE TRANSDUCER ASSEMBLY AND METHOD OF MAKING SAME

This is a continuation of application Ser. No. 890,052 filed Mar. 27, 1978 now abandoned.

BACKGROUND OF THE INVENTION

The transducer structure disclosed herein is adapted for use in the transducer of my co-pending application Ser. No. 843,942 filed Oct. 20, 1977. In that invention, I provided a magnetic assembly within a cylindrical structure, externally threaded. The diaphragm structure was mounted in the base of a tubular member internally threaded to mate with the cylindrical structure and place the magnetic assembly in operative engagement with the diaphragm structure.

The general construction of a transducer such as a conventional bi-polar receiver, called generically a central armature receiver, is shown by U.S. Pat. No. 3,439,130 issued Apr. 15, 1969 to A. J. Chase et al. In that patent, the magnetic subassembly is fabricated on an insulating terminal block which seats within a frame of generally tubular section. Magnetic pole pieces, generally of the shape shown by the patent, may be employed in the present invention.

Customarily in structures such as that of the cited Chase et al patent, the pole pieces are affixed within the terminal block and ground by precision tooling to align the pole tips and space them precisely relative to the block for joinder to the armature and diaphragm assembly.

Air gap adjustment of the concentional type is also shown by U.S. Pat. No. 3,542,974 to Blastic et al as issued Nov. 24, 1970.

SUMMARY OF THE INVENTION

The present invention is directed to an improved structure for the magnet and pole piece assembly of a telephone transducer which may be generically called a central armature receiver.

The magnetic structure includes a permanent bar magnet interposed between the crossbar of identical T-shaped pole pieces. The legs of the pole pieces extend through openings in respective coil bobbins and extend through slots in the base of the assembly housing. The pole piece legs terminate in pole faces or pole tips of desired flatness and alignment. The pole faces confront an armature across an air gap, the acoustic properties of the resulting transducer largely being a result of the proper alignment and positioning of the pole faces and their spacing from the confronting armature. The cited co-pending application is directed to improved structure for producing desired air gap spacing in an economical manner.

The present invention provides an improved magnetic structure which can readily and economically be assembled.

The structure of the present invention provides a terminal block in the form of a cup housing. The housing cavity has aligned spacing and nesting ribs enabling the drop-in assembly of coils, pole pieces and permanent bar magnet. The nesting ribs align the pole pieces so that their pole tips protrude freely through slots in the cup base. By placing these pole faces in magnetic engagement with a magnetic plate, the positioning and alignment of the tips can be performed precisely as part of the assembly process in a simple and economical manner. By holding the engagement while the cup is filled with potting compound, the pole face tips are set into permanent alignment in a common plane.

The positioning of the pole tips, relative to the cup housing, may be in a common plane coincident with the cup base, may be in a plane above the cup base or a plane below the cup base. In this way, the plane of the pole tips will in a plane parallel to or coincident with that of the cup base. By this process, the need for grinding the pole tips to assure a parallel relationship with each other and the cup base is totally eliminated.

It is therefore an object of the invention to provide a new and improved magnetic assembly for a telephone transducer which can be assembled and adjusted simply and economically.

It is a further object of the invention to provide a structure for receiving the magnetic components of a telephone transducer in a drop-in manner, for simple adjustment, alignment and securing the resulting magnetic assembly in a unitary manner.

It is a still further object of the invention to provide a new and improved method of assembling and adjusting the magnetic assembly of a telephone transducer.

BRIEF DESCRIPTION OF THE DRAWINGS

FIG. 3 is a plan view of the cup of FIG. 1;

FIG. 4 is a side view, half sectioned of the cup of FIG. 3.

FIG. 5 is a bottom view of the cup of FIGS. 3 and 4;

DETAILED DESCRIPTION OF THE INVENTION

Figure 1:
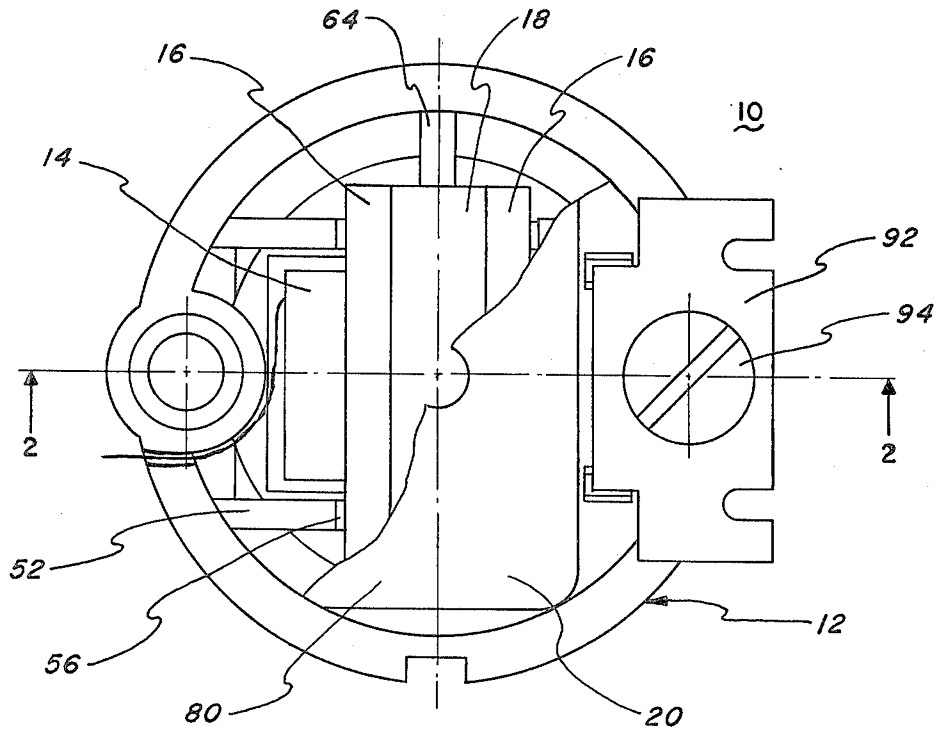
FIG. 1 is a plan view partially broken away of the magnetic assembly of my invention.

In FIG. 1, I show a magnetic assembly 10 of a transducer of the type preferably adapted for use in a magnetic telephone transducer of the type shown in my co-pending application, Ser. No. 843,942 filed Oct. 20, 1977.

The assembly 10 is comprised of a housing or cup 12 into which are inserted magnetic coils 14, pole pieces 16, and permanent magnet 18. A cap 20 is held in covering relation to the cup enclosing its contents. The interior of the cup may be filled with a potting compound suitable for encapsulating electrical components and assemblies.

The cup 12 is shown in greater detail in FIGS. 3-5. The cup may be molded of suitable plastic material having superior dimensional stability. A typical material which could be used is that sold under the trade name Noryl. The cup has an outer generally cylindrical wall 30 stepped inwardly intermediately along its height to an externally threaded section 32 for the purpose set out in my co-pending application as cited. The cup is essentially tubular with an inner generally cylindrical cavity 34 whose bottom extent is defined by the extent of the integral cup base 36. The cup base is otherwise imperforate but has two spaced rectangular slots 38 to communicate between the cup cavity and an inset 40 below the base as seen best in FIG. 4.

As best seen in FIG. 3, the cup has opposed screw-receiving sockets 50 in the upper surface of the sidewall 30, as will be explained.

The cup cavity is generally cylindrical and has pairs of opposed ribs upstanding in the cavity to form drop-in nests for the inserted components as previously noted.

Figure 8:
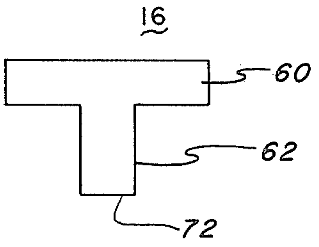
FIG. 8 is a side view in elevation of a pole piece as shown in FIGS. 1 and 2.

Two pairs of spaced ribs 52 form the partial sidewalls to receive and position the two electromagnetic coils 14. The wall of the sockets 50 also act to position the coils on the cup base 36, or on a gasket or spacer 54 resting on the cup base 36. The ribs 52 have rectangular offsets 56 at the inner ends for supporting thereon the arms 60 (FIG. 8) of the T-shaped pole pieces 16. The pole piece arms 60 are symmetrical about the pole tip 62, the pole tip sized to pass through base slots 38 as the arms rest on offsets 56. The pole pieces are fabricated of a suitable nickel alloy conventionally used in telephone transducers.

The permanent magnet 18 is inserted between the pole piece arms on the top of the bobbin of the coils 14 with ribs 64 acting to position the magnet 18, as seen best in FIG. 1.

Thus, the cavity has ribs 52 and 64 configured to properly position the seal 54, coils 14, pole pieces 16 and permanent magnet 18 within the cavity by drop-in insertion.

As mentioned, with the pole pieces passing through the cup base slots, the pole piece cross arms rest on the rib offsets 56. The pole tips may and preferably should extend below the plane 70 defined by the bottom surface of sidewall 30 with the pole faces 72 essentially parallel to the plane 70.

With the coils, pole pieces and magnet assembled into the cup, the cup is placed on a metallic plate 74 of magnetically retentive material, the cup resting along the plane 70. The pole tips 62 engage the surface of plate 74 and are attracted to the plate with a firm hold. The pole tips are thus held with their pole faces 72 parallel to the plane 70. As shown, the pole faces will be in plane 70. If desired, the pole faces could be held above plane 70 by the use of shims or spacers, or could be below plane 70 by resting the cup sidewall on a suitable spacer. For simplicity and convenience in assembly, the approach shown of having the pole faces 72 in plane 70 has been adopted. This approach allows the cup to be placed directly on plate 74 without the necessity of locating the cup relative to spacers and the like.

With the cup on the magnetic plate 74 and the pole faces 72 attracted to the plate, the pole cross arms will rise above the offsets 56 and the coil bobbins. The permanent magnet and pole cross arms will be held in a magnetic circuit completed by the magnetic plate and will be firmly held in place.

Figure 2:
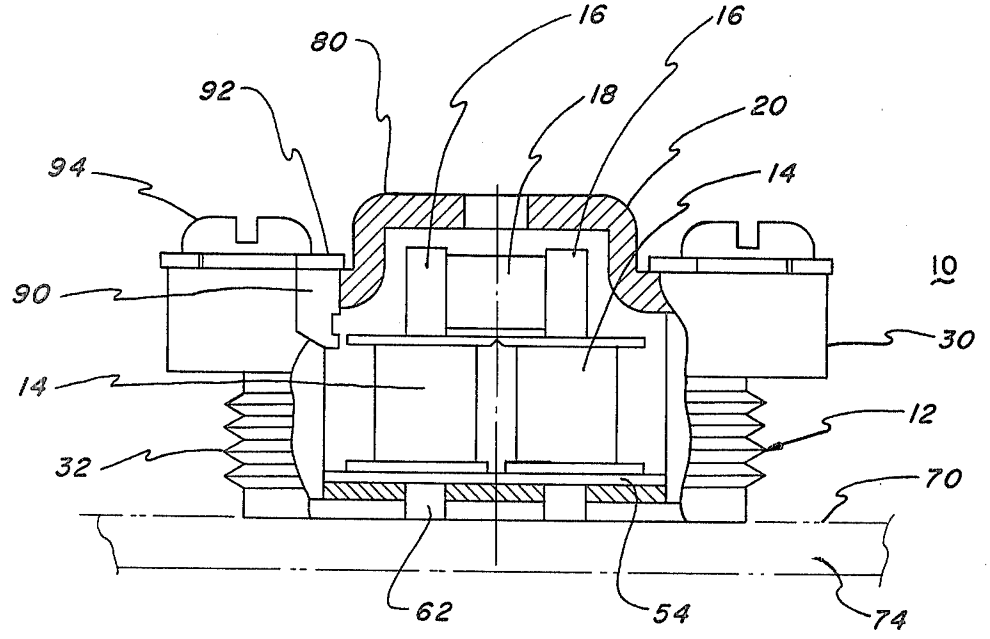
FIG. 2 is a sectional view taken along lines 2—2 of FIG. 1.
Figure 10:
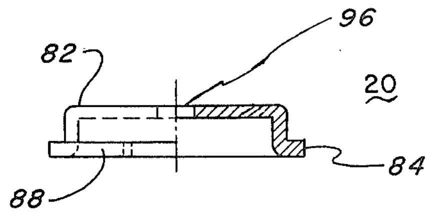
FIG. 10 is a side view partly in elevation and partly in section of a cap as used in FIGS. 1 and 2.
Figure 9:
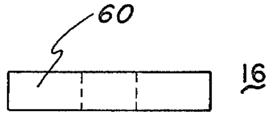
FIG. 9 is a plan view of the pole piece of FIG. 8.
Figure 11:
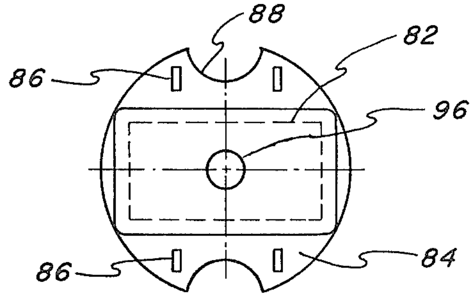
FIG. 11 is a plan view of the cap of FIG. 10.

Cap 20 may then be fitted to cover the cup cavity 34. The cap 20, seen best in FIGS. 2, 10 and 11, has a rectangular cover 82 and a stepped circular flange 84 with opposed semi-circular cutouts 88 for the terminal screw sockets 50. The flanged portion 84 has four slots 86 for receiving the respective horizontal terminal tips 90 of the terminal 92 (FIGS. 1 and 2). Wires from the coil bobbins may be connected to the terminal tips at any intermediate stage in a conventional manner. The cap is set onto the top of the cup, the terminal 92 is set onto the cap with the horizontal tips 90 extending through the slots 86.

The assembly is then ready for the introduction of potting compound into the cup cavity through the opening 96 in the cap. Any air drying potting compound suitable for electrical or electronic component use such as epoxy may be injected or otherwise introduced into the cavity 34 through the injection opening 96. As the compound hardens or sets, the magnetic circuit (including the pole faces to magnetic plate attraction) remains intact and the relative positioning of the pole faces relative to the magnetic plate remains constant. When the potting compound has hardened, the assembly may be removed from the magnetic plate and the pole faces will remain in the plane parallel or coexistent with that of plane 70.

Figure 6:
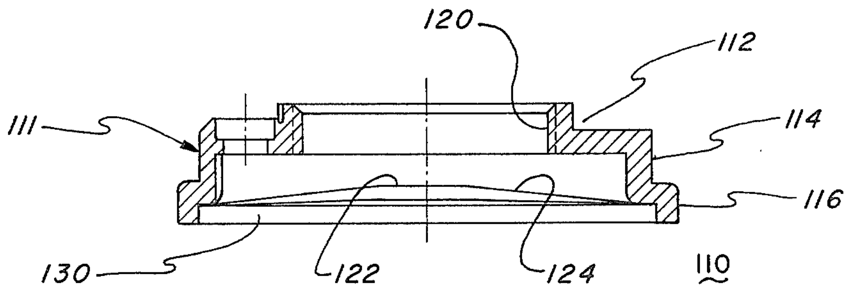
FIG. 6 is a side view in section of one type of diaphragm assembly usable with the magnetic assembly of FIGS. 1 and 2.
Figure 7:
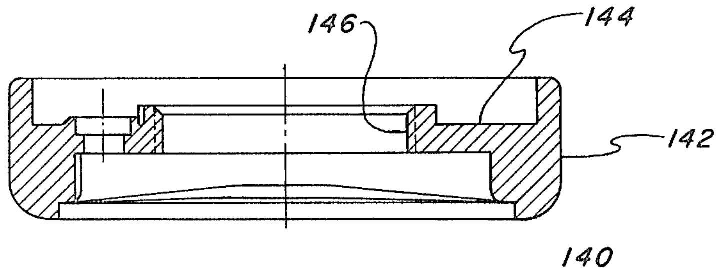
FIG. 7 is a side view in section of a second type of diaphragm assembly usable with the magnetic assembly of FIGS. 1 and 2.

In FIGS. 6 and 7, I show two alternate forms of diaphragm/housing assembly into which the magnetic assembly 10 may be further assembled. In FIG. 6, the housing assembly 110 includes an outer zinc alloy housing 111 of concentric cylindrical tubular sections 112, 114 and 116 and having an inner female threaded section 120. A disc armature 122 is held by a diaphragm 124 in position adjacent section 120. A protective screen or perforate grid 130 may be used to cover the armature from its exposed side in a known manner. The diaphragm and grid may be held in place by any conventional means such as crimping or swaging the edge of the lower section over the outer periphery of the grid.

As detailed in the cited co-pending application, the threaded section 32 is inserted into female threaded section 120 of the housing 11 and is tightened until the air gap between the magnetic pole faces 72 and the armature 122 is of a desired level. The adjustment is made by monitoring the acoustic output of the transducer on a suitable instrument as the magnetic assembly is advanced into the housing assembly by the mated threads until a desired response level is achieved. At that response level, adhesive previously applied to the threads is allowed to harden and set the air gap at the desired level. At this point, the terminal screws 94 and a varistor may be assembled if required for a particular application of the transducer.

In FIG. 7, a transducer such as a receiver housing 140 of another configuration is used, that normally designed for use in the handset of a conventional telephone. The outer cylindrical wall 142 of the housing is of one diameter on intermediate arcuate web 144. The inner threaded bore 146 from the outer wall, the inner bore being sized to mate with and receive the threaded section 32 of the magnetic assembly 10, in the manner previously described for the receiver housing of FIG. 6.

By the use of the construction as set out, a magnetic assembly can be readily completed using drop-in parts which fit into nesting members within a cup-shaped housing. The magnetic structure is held magnetically in proper alignment and positioning without the need for subsequent adjustments and/or after assembly grindings. With the magnetic structure alignment held magnetically, the alignment and position may be set and fixed. The fixed position is maintained by the set of a potting compound introduced into the cup and allowed to harden as the pole face position is held magnetically. The completed magnetic assembly may be mated with a housing assembly to complete the receiver.

I claim:

1. A method of assembling a transducer comprising the steps of (a) positioning a plurality of magnet pole pieces loosely within a first cup structure, (b) completing a magnetic path through the pole pieces to align the pole faces of the pole pieces in a plane parallel to the base of the cup structure, (c) holding said magnetic path to maintain the position of the pole faces in the plane while applying a material to said cup structure for permanently fixing the position of said pole faces relative to said plane, thereafter, (d) joining said cup structure to a second cup structure bearing an armature in confronting relationship to said pole faces, (e) adjusting the air gap between said pole faces and said armature, and (f) securing the joinder of said cup structures with said adjusted gap, and (g) in which the step of positioning the placing of the pole pieces is accomplished by inserting the pole pieces into the cavity of said first cup structure so that the pole faces pass through openings in the base of the first cup structure and are located relative to the base of the first cup structure housing.

2. The method of claim 1, in which the step of completing the magnetic path is accomplished by placing the first cup structure with its base downward on a magnetically retentive plate adjacent the pole faces to magnetically attract the pole faces at one end of the pole pieces adjacent the base of the cup structure and by inserting a permanent magnet between the pole pieces at the opposite end of the pole pieces.

3. The method of claim 2, in which the step of permanently fixing the pole face positions is accomplished by introducing a permanently settable liquid into the cavity of the first cup structure.

4. The method of claim 3, in which the step of inserting the pole piece is preceded by a step of aligning a pair of electromagnetic coils in the cup cavity with central core openings of the coils in communication with the openings in the base of the cup structure to form a passage for the pole tips during the placement of the pole pieces in the cavity.

5. The method of claim 4, in which a cover is fitted on said first cup structure after said pole pieces are attracted to and held by the magnetically retentive plate and thereafter introducing a potting compound through an opening in said cover to fill the cavity of the first cup structure prior to adjustment of the air gap.

6. The method of claim 5, in which terminals for connecting the coils to outside conductors are permanently fixed onto the cover by inserting legs of the terminals into the cup cavity through the cover whereby the hardening of the potting compound acts to secure the terminals in place.

7. A telephone transducer of the central armature type comprised of an electromagnetic driving assembly and a magnetically driven assembly cooperatively joined, said driving assembly comprising a unitary cup-shaped housing having a cylindrical sidewall and disc-shaped base, a pair of essentially T-shaped pole members each having a cross head and a depending leg, aligned slots in said base, the tips of the respective legs extending through the slots in said base, laterally disposed positioning members disposed interiorly of said cup housing for receiving and holding said pole members within said slots during assembly of the driving assembly, said positioning members preventing sidewise movement of said pole members and movement of said members toward said base, an electromagnetic coil surrounding each of said pole members and resting on said base, a permanent magnet resting attractively between the cross heads of said pole members, and means for permanently securing said pole members in said cup housing with said pole tips in a plane parallel to the base of said housing, said housing including cooperative means for mating said driving assembly structure with said driven assembly with said base confronting said driven assembly to position said pole tips in a plane parallel to a central disc armature within a diaphragm held by said driven assembly.

8. A telephone transducer as claimed in claim 7, in which there are further positioning members in said cup housing for positioning said coils on said housing base against sidewise movement.

9. A telephone transducer as claimed in claim 7, in which there is a domed cover mounted on said cup housing at the end remote from the mating with said driven assembly, with said cover having an opening to allow hardening compound to be introduced into said cup housing.

10. A telephone transducer as claimed in claim 9, in which said mating of driving to driven assembly comprises peripheral threading on the cylindrical sidewall of the housing for joinder to mating female threading on a cylindrical wall of the driven housing.

* * * * *